US011527106B1

(12) United States Patent
Raman

(10) Patent No.: US 11,527,106 B1
(45) Date of Patent: Dec. 13, 2022

(54) AUTOMATED VIDEO VERIFICATION

(71) Applicant: Bank of America Corporation, Charlotte, NC (US)

(72) Inventor: Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/177,659

(22) Filed: Feb. 17, 2021

(51) Int. Cl.
*G06V 40/16* (2022.01)
*G06V 20/40* (2022.01)

(52) U.S. Cl.
CPC ............ *G06V 40/171* (2022.01); *G06V 20/46* (2022.01)

(58) Field of Classification Search
CPC .............................. G06V 40/171; G06V 20/46
See application file for complete search history.

(56) References Cited

U.S. PATENT DOCUMENTS

| | | | |
|---|---|---|---|
| 5,842,191 A | 11/1998 | Stearns | |
| 9,659,185 B2 | 5/2017 | Elovici et al. | |
| 10,262,236 B2 | 4/2019 | Lim et al. | |
| 10,311,289 B2* | 6/2019 | Sun | G06V 40/171 |
| 2004/0131254 A1 | 7/2004 | Liang et al. | |
| 2007/0011711 A1 | 1/2007 | Wolf et al. | |
| 2011/0317009 A1 | 12/2011 | Kumaraswamy et al. | |
| 2014/0250457 A1 | 9/2014 | Ramaswamy | |
| 2015/0256835 A1 | 9/2015 | Sakai | |
| 2016/0004914 A1 | 1/2016 | Park | |
| 2016/0019426 A1 | 1/2016 | Tusch et al. | |
| 2017/0185829 A1 | 6/2017 | Walsh et al. | |
| 2017/0223310 A1 | 8/2017 | Farrell et al. | |
| 2017/0311863 A1 | 11/2017 | Matsunaga | |
| 2018/0114017 A1 | 4/2018 | Leitner et al. | |
| 2018/0225518 A1 | 8/2018 | Gu et al. | |
| 2018/0268222 A1 | 9/2018 | Sohn et al. | |
| 2018/0316890 A1 | 11/2018 | Farrell et al. | |
| 2018/0341878 A1 | 11/2018 | Azout et al. | |
| 2018/0349721 A1* | 12/2018 | Agrawal | G06V 40/45 |
| 2019/0029528 A1 | 1/2019 | Tzvieli et al. | |
| 2019/0046044 A1 | 2/2019 | Tzvieli et al. | |
| 2019/0052839 A1 | 2/2019 | Farrell et al. | |
| 2019/0073523 A1 | 3/2019 | Lee et al. | |
| 2019/0122072 A1 | 4/2019 | Cricri et al. | |
| 2019/0147333 A1 | 5/2019 | Kumar et al. | |
| 2019/0164173 A1 | 5/2019 | Liu et al. | |
| 2019/0179861 A1 | 6/2019 | Goldenstein et al. | |
| 2019/0213720 A1 | 7/2019 | Urashita | |
| 2019/0213721 A1 | 7/2019 | Urashita | |

(Continued)

OTHER PUBLICATIONS

Raman, S., "Media Player and Video Verification System," U.S. Appl. No. 17/177,451, filed Feb. 17, 2021, 38 pages.

*Primary Examiner* — Wesley J Tucker

(57) ABSTRACT

A media source is configured to provide a media stream that includes an audio-video recording. A first algorithm detects a presence of synthetic media in a video based on a first feature type. A second algorithm detects the presence of synthetic media based on a second feature type. A device determines that the first feature type is presented in a selected portion of the image frames but the second feature type is not. In response, the first algorithm is executed using the selected portion of the image frames as an input. Based on the executed first algorithm, a probability is determined that the media stream provided by the media source includes synthetic media.

20 Claims, 5 Drawing Sheets

(56) References Cited

U.S. PATENT DOCUMENTS

| | | |
|---|---|---|
| 2019/0220652 A1* | 7/2019 | Li .................... G06N 3/0454 |
| 2019/0236614 A1 | 8/2019 | Burgin et al. |
| 2019/0258870 A1 | 8/2019 | Kundu et al. |
| 2019/0278378 A1 | 9/2019 | Yan et al. |
| 2019/0290127 A1 | 9/2019 | Hanina et al. |
| 2019/0290129 A1 | 9/2019 | Hanina et al. |
| 2019/0303655 A1 | 10/2019 | Werner et al. |
| 2019/0313915 A1 | 10/2019 | Tzvieli et al. |
| 2019/0349613 A1 | 11/2019 | Pikes et al. |
| 2019/0355128 A1 | 11/2019 | Grauman et al. |
| 2020/0074183 A1 | 3/2020 | Altuev |
| 2020/0092301 A1 | 3/2020 | Coffing |
| 2020/0302609 A1* | 9/2020 | Rong .................... G06T 7/248 |
| 2021/0209388 A1* | 7/2021 | Ciftci .................... G06V 40/40 |
| 2021/0233204 A1* | 7/2021 | Alattar .................... G06T 1/005 |
| 2021/0303890 A1* | 9/2021 | Wei .................... G06V 40/161 |
| 2022/0086646 A1* | 3/2022 | Eibon .................... H04L 9/3236 |
| 2022/0129664 A1* | 4/2022 | Li .................... G06N 3/084 |
| 2022/0138472 A1* | 5/2022 | Mittal .................... G06K 9/6215 382/181 |

* cited by examiner

AUTOMATED VIDEO VERIFICATION

TECHNICAL FIELD

The present disclosure relates generally to synthetic media. More particularly, in certain embodiments, the present disclosure is related to automated video verification.

BACKGROUND

Synthetic media, such as so called "deepfake" videos, can be generated to mislead media consumers. For instance, a video of an individual speaking can be edited or generated to make it appear as though a person has spoken words that her/she did not actually speak and/or performed actions he/she did not actually perform.

SUMMARY

Synthetic media is becoming increasingly realistic and difficult to recognize. Humans are generally unable to reliably identify images and videos that contain synthetic media. Previous technology is also incapable of reliably and efficiently detecting synthetic media and effectively informing users that they are potentially viewing synthetic media. This disclosure recognizes that previous technology fails to effectively manage and deploy tools for detecting synthetic media. For example, previous technology fails to provide an efficient means for integrating multiple synthetic media detection models and communicating the presence of detected synthetic media to media viewers.

Certain embodiments of this disclosure provide unique solutions to technical problems of previous technology, including those described above, by providing an intelligent model selector that identifies synthetic media detection tools appropriate for a given media type and a media player that dynamically presents the likelihood that viewed media is synthetic media. For example, the disclosed system provides several technical advantages which may include 1) the efficient and reliable determination and deployment of appropriate synthetic media detection models based on properties of media being viewed and/or the video player used to view the media; 2) the automatic allocation or selection of processing resources to efficiently and reliably execute a preferred algorithm or model for improved synthetic media detection; and 3) the presentation of a dynamically updated indicator of the probability that displayed media includes synthetic media. As such, this disclosure may improve the function of computer systems used to present media, detect synthetic media, and/or report any suspected synthetic media. For example, the system described in this disclosure may decrease processing resources required to review media and improve the reliability of the results of this review.

In some embodiments, the systems, methods, and devices described in this disclosure may particularly be integrated into a practical application of a media player configured for dynamic synthetic media detection. The media player automatically reviews media that is being viewed and presents a synthetic media score that represents a probability that the viewed media includes synthetic media. In some embodiments, the systems, methods, and devices described in this disclosure may particularly be integrated into a practical application of a media player device with a model selection component. The model selection component determines one or more synthetic media model detection models that can reliably and/or efficiently detect synthetic media for a given media stream and coordinates the allocation of computing resources for executing the determined model(s).

Certain embodiments of this disclosure may include some, all, or none of these advantages. These advantages and other features will be more clearly understood from the following detailed description taken in conjunction with the accompanying drawings and claims.

In an embodiment, the system includes a media source is configured to provide a media stream that includes an audio-video recording. The audio-video recording comprises image frames. A video presentation device receives the media stream provided by the media source and selects a portion of the image frames of the media stream. The device determines, based at least in part on characteristics of the video presentation device and properties of the selected portion of the image frames, a processing resource for executing an algorithm configured to determine a probability that the media stream includes synthetic media. The selected portion of the frames and an indication of the algorithm are provided to the processing resource. The processing resource executes the algorithm to determine the probability that the media stream includes synthetic media. The audio-video recording and a representation of the probability that the media stream includes synthetic media are displayed.

In another embodiment, the system includes a media source that is configured to provide a media stream that includes an audio-video recording. The audio-video recording comprises image frames. A video presentation device includes a memory and a processor communicatively coupled to the memory. The memory stores instructions configured to, when executed by the processor, implement a first algorithm for detecting a presence of synthetic media in a video based on properties of a first feature type in the video and implement a second algorithm for detecting the presence of synthetic media in the video based on properties of a second feature type in the video. The processor selects a portion of the image frames of the media stream. The processor determines, based at least in part on properties of the selected portion of the image frames, that the first feature type is presented in the selected portion of the image frames. The processor determines, based at least in part on properties of the selected portion of the image frames, that the second feature type is not presented in the selected portion of the image frames. In response to determining that the first feature type is presented in the selected portion of the image frames and that the second feature type is not presented in the selected portion of the image frames, the first algorithm is executed using the selected portion of the image frames as an input. Based on the executed first algorithm, a probability is determined that the media stream provided by the media source includes synthetic media.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably detecting synthetic media and presenting results of this detection. The system described in this disclosure solves the technical problems of previous technology by detecting synthetic media using one or more detection models or algorithms that are specially selected to facilitate more reliable and efficient detection than was possible using previous technology. The system facilitates the presentation of a dynamically determined probability that viewed media includes synthetic media.

As used in this disclosure, media generally refers to video, images, and/or audio content. However, media encompasses any other appropriate media which may be shared and/or distributed in a digital format. An example of media for a subject is a video of the subject speaking. As used in this disclosure, "real media" refers to media that depicts (e.g., is a recording or other representation of) the subject without any adulteration to the information provided in the media. For example, a "real" video of a subject may be an audio-visual recording of the subject speaking. As used in this disclosure, "synthetic media" refers to media which has been edited to attribute actions and/or words to a subject that were not performed/spoken by the subject. For example, a "synthetic" video may include an edited version of a "real" video of the subject speaking which has been created or edited to show the subject speaking words that were not actually spoken by the subject in the real video.

System for Synthetic Media Detection and Reporting

Figure 1:
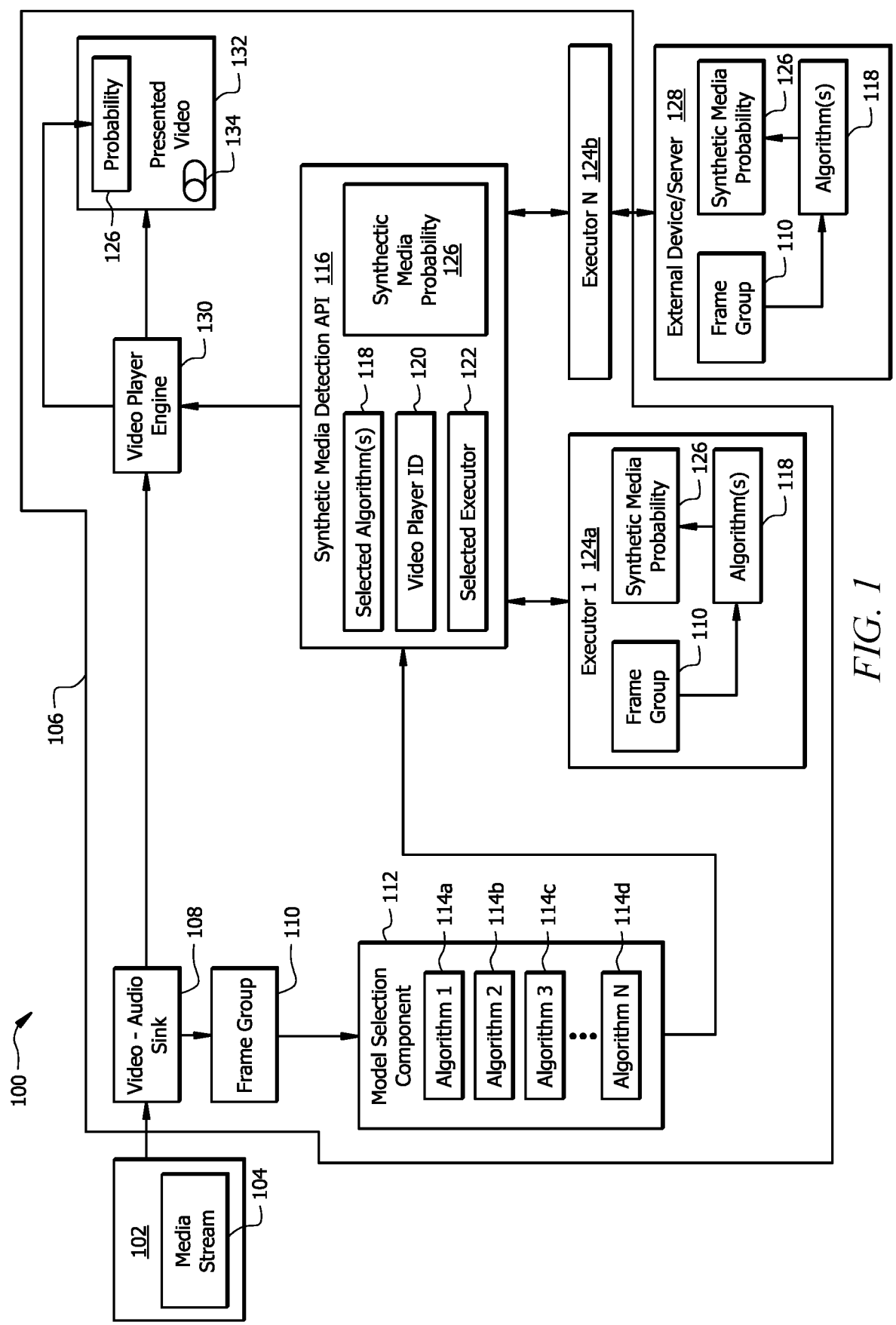
FIG. 1 is a schematic diagram of an example media player system configured for synthetic media detection.

FIG. 1 is a schematic diagram of an example media player system 100 for presenting a video 132 from a media stream 104 and displaying a probability 126 that the video 132 includes synthetic media. The system 100 includes one or more media sources 102, a media player device 106, and an external device or server 128.

The one or more media sources 102 generally include any source(s) of a media stream 104, such as a server, data store, or database. For instance, the media stream 104 may be provided or retrieved over a network from a server media source 102 configured to host the media stream 104. The media stream 104 may include any type of media such as one or more videos 132 (e.g., audio-visual recordings), audio recordings, images, and the like. For example, the media stream 104 may include an audio-visual recording or video 132 of an individual speaking. The media source(s) 102 may be implemented using the processor, memory, and interface of the device 500 described with respect to FIG. 5 below.

The media player device 106 is generally any device operable to receive the media stream 104 and display a video 132 included in the media stream 104. The media player device 106 includes a video-audio sink 108, a model selection component 112, a synthetic media detection API 116, executors 124a,b, and video player engine 130. The media player device 106 and its various components 108, 112, 116, 124a,b, 130 may be implemented using the processor, memory, and interface of the device 500 described with respect to FIG. 5 below. The video-audio sink 108 uses memory of the media player device 106 (e.g., the memory 504 of the device 500 of FIG. 5) to store, at least temporarily, the media stream 104 as it is received. The video-audio sink 108 provides the media stream 104 to the video player engine 130 and provides at least a portion of the media stream 104 as frame group 110 to the model selection component 112. The video-audio sink 104 may temporarily delay provisioning of the media stream 104 to the video player engine 130, such that operations of the model selection component 112, synthetic media detection API 116, and executor(s) 124a,b may be performed to determine the probability 126 that the media stream 104 includes synthetic media before the video 132 is displayed. The frame group 110 may be stored in memory of the device 106 (e.g., the memory 504 of the device 500 of FIG. 5) as a portion of image frames of the media stream 104. The selected frame group 110 of the media stream 104 is provided to the model selection component 112.

As described in greater detail below and with respect to FIGS. 2 and 4, the model selection component 112 generally determines characteristics of the selected image frames of the frame group 110 received from the video-audio sink 108 and uses these characteristics to select one or more models or algorithms 114a-d to employ as selected algorithm(s) 118 for detecting the presence of synthetic media in the media stream 104. The practical application of a media player 106 with the model selection component 112 facilitates the efficient and reliable determination and deployment of appropriate synthetic media detection models or algorithms 114a-d, as selected algorithm(s) 118, based on properties of the media stream 104 being viewed and/or the video player device 106 used to view the media stream 104 of video 132.

Algorithms 114a-d are generally predetermined algorithms or models for detecting synthetic media. Examples of algorithms 114a-d include neural network-based algorithms, algorithms based on face-point symmetry, blockchain-based algorithms, algorithms based on biometrics, and the like. For instance, a neural network-based algorithm 114a-d may employ a convolutional neural network (CNN) that is trained to determine the probability 126 that a given portion of media (e.g., a video, image, sound recording) includes synthetic media. Algorithms 114a-d based on face-point symmetry generally detect the presence of synthetic media based on the symmetry properties of faces presented in videos and/or images. Blockchain-based algorithms 114a-d can be used to verify whether certain media that has been associated with a blockchain or distributed ledger includes synthetic media. A blockchain or distributed ledger is generally a shared data store or database that is distributed amongst multiple devices. A distributed ledger may be used to maintain a record of changes and or usage of a media stream 104 or video 132, such that the authenticity of the media stream 104 or video 132 can be verified. For example, upon creation or storage a video 132, the video 132 may have been associated (e.g., via metadata of the video 132) with an entry in a blockchain or distributed ledger. Additional entries may be added to the distributed ledger throughout the lifetime of the video 132 (e.g., if the video 132 is copied, moved, or the like). A consensus-based review of the blockchain or distributed ledger may be used to ensure that the video 132 is not changed, such as through the addition of synthetic media, since its original creation/storage. Algorithms 114a-d based on biometrics generally detect biometric features in media (e.g., perspiration, breathing rate, heart rate, etc.) and use these values to detect synthetic media (e.g., if the biometric features or values are outside a predefined range). An example, photoplethysmography (e.g., measurement of changes in skin color/tone associated with changes in blood flow) may be used to make biometric measurements in images from frame group 110 related to blood flow and/or circulation of subjects presented in the video 132.

The model selection component 112 may identify types of features that are present in the frame group 110 and determine which of the algorithms 114*a-d* are capable of detecting synthetic media based on the available types of features. As an example, if the frame group 110 includes an appropriate front-side view of a face, a face point symmetry-based algorithm 114*a-d* may be included as a selected algorithm 118. However, if an appropriate face view is not presented in the frame group 110, then the face point symmetry-based algorithm 114*a-d* will not be included as a selected algorithm 118. As another example, in order for blockchain-based algorithms 114*a-d* to be included as a selected algorithm 118, the frame group 110 (or the original media stream 104) must be appropriately associated (e.g., through the inclusion of metadata or the like) with a blockchain or distributed ledger.

The synthetic media detection API 116 generally acts as an interface between executors 124*a,b*, which execute the selected algorithm(s) 118, and the video player engine 130, which displays the video 132 from the media stream 104. The synthetic media detection API 116 receives the selected algorithm(s) 118 from the model selection component 112. The synthetic media detection API 116 may also receive or determine a video player identifier 120 associated with the media player device 106. The video player identifier 116 may identify the hardware capabilities of the media player device 106 (e.g., an amount of memory and processing resources of the media player device 106). The synthetic media detection API 116 determines a selected executor 122, which includes an identification of which of the one or more of the executors 124*a,b* to use to execute the selected algorithm(s) 118.

The selected executor 122 may be determined based on properties of the selected algorithm(s) 118 and/or the hardware properties of the media player device 106 determined from the video player identifier 120. For example, the synthetic media detection API 116 may determine, based on a type of the algorithm(s) 118 and/or a file size of the frame group 110, an amount of processing resources needed to execute the algorithm(s) 118. If this amount of processing resources is less than what is available to the media verification device 106 (e.g., below a maximum resource level provided by a central processing unit (CPU) and/or graphical processing unit (GPU) of the device 106), then the selected executor 122 may be an in-device executor that executes in the device 106, such as example executor 124*a* of FIG. 1. Alternatively, if the required processing resources exceed that of the device, an external-device executor, such as executor 124*b* of FIG. 1, may be used to execute the algorithm 118 using the separate device/server 128. In certain cases where there are multiple selected algorithms 118, one selected algorithm 118 may be executed by the in-device executor 124*a*, while another selected algorithm 118 is executed by the external-device executor 124*b*. Through the determination of the selected executor 122, the media player device 106 automatically allocates or selects the processing resources to efficiently and reliably execute the preferred selected algorithm(s) 118 for improved synthetic media detection. These features contribute to the practical application of the media player device 106 configured for synthetic media detection.

The executors 124*a,b* are generally configured to execute the selected algorithm(s) 114. For example, the executors 124*a,b* may be any code, logic, or rules that are executed by the media player device 106 to implement the selected algorithm(s) 118. Executors 124*a,b* generally use the frame group 110 as an input to the selected algorithm(s) 118 and generate a synthetic media probability 126 as an output. The synthetic media probability 126 is the probability that the media stream 104 and/or video 132 includes synthetic media. The synthetic media probability 126 is provided to the synthetic media detection API 116, which in turn provides the probability 126 to the video player engine 130 for presentation along with the displayed video 132.

In the example of FIG. 1, the first executor 124*a* implements the algorithm(s) 118 using computing resources of the media player device 106. Meanwhile, the $n^{th}$ executor 124*b* implements the selected algorithm(s) 118 using an external device or server 128. As described above, executor 124*b* may be selected (e.g., as selected executor 122) if the media player device 106 lacks sufficient computing resources for executing the algorithm(s) 118. In some cases, instructions for implementing a particular selected algorithm 118 may only be available on the external device or server 128. As such, in these cases, the executor 124*b* may be used even if the media device 106 has sufficient computing capacity or resources to execute the particular selected algorithm 118.

The external device or server 128 may be any computing device, or collection of computing devices, configured to execute one or more of the algorithms 110*a-d*. The external device or server 128 can generally have a much higher computing capacity than media device 106. In some embodiments, the external device or server 128 is a quantum computing device configured to execute a quantum artificial intelligence method of machine learning. The external device or server 128 may be implemented using the processor, memory, and interface of the device 500 described with respect to FIG. 5 below.

The video player engine 130 of the media player device 106 receives the media stream 104 and the synthetic media probability 126 and displays both. For example, the video player engine 130 may display the media stream 104 as displayed video 132 with an overlay of the synthetic media probability 126. Thus, the media player device 106 includes the technical improvement of a dynamically updated indicator of the probability 126 that displayed video 132 includes synthetic media. This feature contributes to the practical application of the media player device 106 configured for improved synthetic media detection. In some embodiments, the synthetic media probability 126 is added as a watermark to the displayed video 132. In some embodiments, a toggle button 134 or other option field may be presented in or around the displayed video 132 in order for a user to request that the probability 126 be presented or hidden. As such, the video media player device 106 may receive a user input based on operation of the toggle button 134, determine if the user input corresponds to a request to display or hide the probability 126, and either display or hide the probability 126 based on this request. In some cases, the probability 126 is only determined if a user requests display of the probability 126, thereby conserving processing resources of the media player device 106. In other cases, the probability 126 is determined even when display of the probability 126 is not currently requested. This allows the probability 126 to be immediately available for display when such display is requested.

In an example operation of the system 100, a media stream 104 is received by the media player device 106. The media stream 104 includes a video 132 (i.e., an audio-visual recording) of a person speaking. The person is viewed from the side in the video 132, such that a portion of the person's face is not visible. The video-audio sink 108 of the media player device 106 temporarily stores the media stream 104 as it is received and passes a portion of the media stream 104 to the model selection component 112 as frame group 110. The media player device 106 may select the frame group 110 to include image frames of the media stream 104 that include the person. The frame group 110 may include the audio for each of the selected frames.

Figure 2:
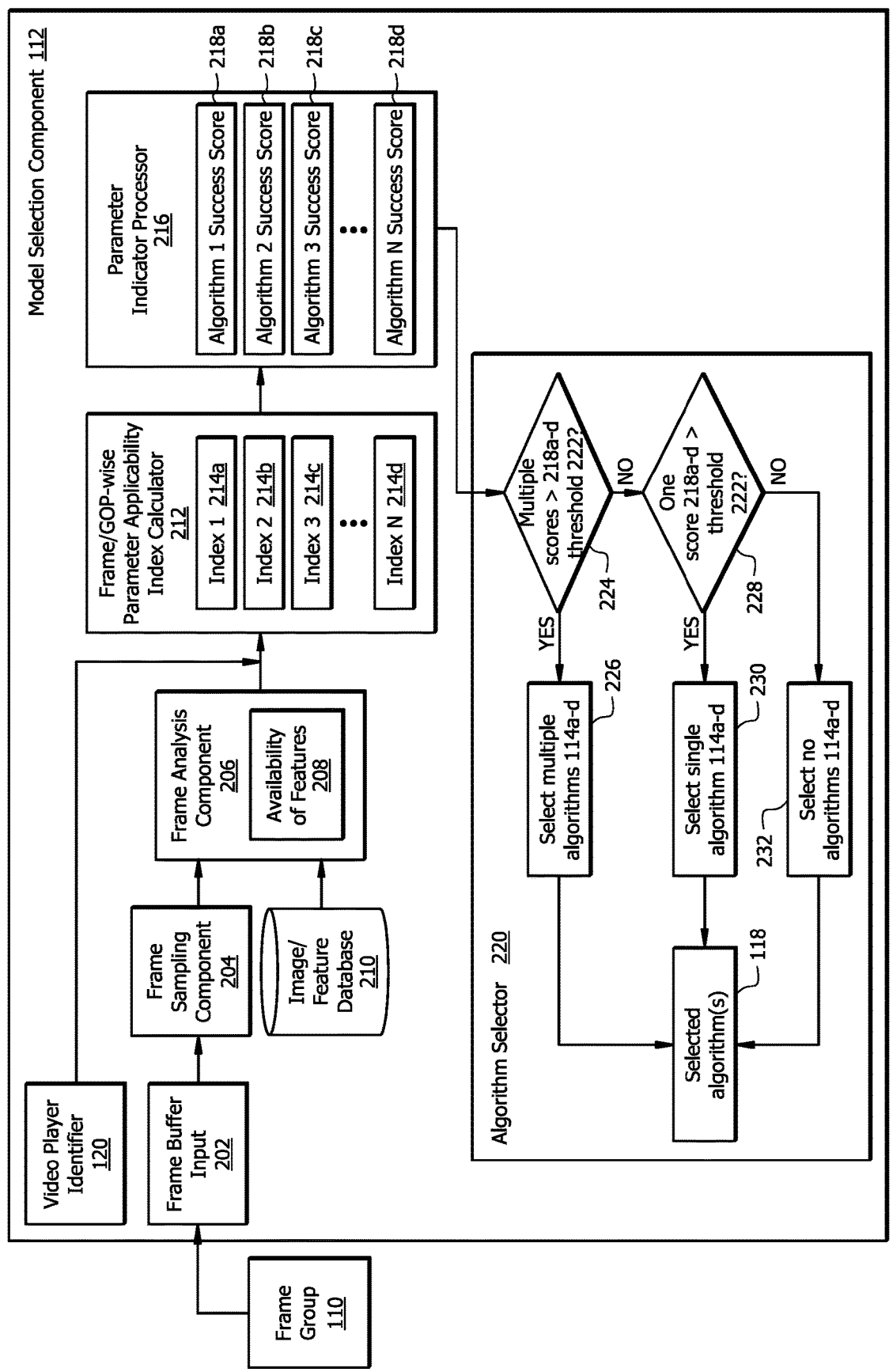
FIG. 2 is a flow diagram illustrating operation of the model selection component of the media player system of FIG. 1 in greater detail.

FIG. 2 illustrates an example operation of the model selection component 112. As illustrated in FIG. 2, the frame group 110 is received and stored as a frame buffer input 202. The frame buffer input 202 is passed to a frame sampling component 204. The frame sampling component 204 may select a subset of the frame buffer input 202. For example, the frame selection component 204 may select a subset of the frame buffer input 202 that should be used for subsequent feature selection. For instance, the selected subset may include video frames that present views of the person speaking in the video 132 of the media stream 104. The model selection component 112 may expend fewer processing and memory resources by using only a subset of the frame group 110 in order to determine the selected algorithm(s) 118, thereby improving the speed of automatically determining the selected algorithm(s) 118.

Still referring to FIG. 2, video frames selected at the frame sampling component 204 are passed to a frame analysis component 206. The frame analysis component generally uses the video frames from the frame sampling component 204 and information from an image/feature database 210 to determine the availability 208 of features in the video frames. The feature availability 208 generally includes a measure (e.g., a qualitative or quantitative score) or indication (e.g., a positive or negative or "yes/no" indication of the presence of the feature type) for various features in the video frames that may be used for synthetic media detection. The image/feature database 210 generally includes a set of predefined feature types that have a predefined relationship or use for detecting synthetic media using the various algorithms 114a-d. The image/feature database 210 may store features of known individuals, such as celebrities or other individuals for whom bad actors may wish to create synthetic media.

The feature availability 208 generally indicates whether features are present in the video frames for detecting synthetic media using one of the algorithms 114a-d. For instance, in this example operation of the media player system 100, the frame analysis component 206 may determine that face-symmetry features are not available or determine a relatively low availability 208 value or a negative availability 208 for face symmetry features, because the video 132 of the media stream 104 does not include a front-side view of the face of the person. As another example, if the media stream 104 is associated with a blockchain or distributed ledger (e.g., via metadata of the media stream 104 or video 132), then the frame analysis component 206 may determine a positive availability 208 of features for blockchain-based detection of synthetic media are available. As yet another example, the frame analysis component 206 may determine a positive availability 208 of biometric in the selected video frames, including, for example, breathing rate, rate of blinking, amount of skin flushing, and the like for the person presented in the video frames. The frame analysis component 206 may determine the availability 208 of any appropriate biometrics. As another example, the frame analysis component 206 may determine if one or more people presented in the video frames are a known person (e.g., a person for whom predefined features are stored in the image/frame database 210). The frame analysis component 206 may determine the availability 208 of any other appropriate features for the detection of synthetic media and the determination of selected algorithm(s) 118.

A frame-wise parameter applicability calculator 112 uses the feature availabilities 208 to determine an index value 214a-d for each feature type. Each index value 214a-d allows the feature availabilities 208 to be presented as a quantitative value (e.g., a value from zero to one, or the like). As an example, the index calculator 212 may determine a face clarity index value 214a-d. The face clarity index value 214a-d may be a quantitative indication (e.g., a number) corresponding to the clarity one or more faces presented in the video frames of the input 202, and this information may be associated with the ability to identify people appearing in the video frames and use certain synthetic media detection algorithms 114a-d. The index calculator 212 may determine a number-of-faces index value 214a-d. The number-of-faces index value 214a-d may be the number of different faces appearing in the video frames of the input 202. The index calculator 212 may determine a blockchain authorization index value 214a-d. The blockchain authorization index value 214a-d indicates whether blockchain information is associated with the video frames of the input 202. The index calculator 212 may determine a biometric availability index value 214a-d. for example, the biometric availability index value 214a-b may be a quantitative indication of whether biometric information can be determined in the video frames of the input 202. For instance, the biometric availability index value 214a-d may indicate whether techniques such as photoplethysmography may be performed using the video frames of the input 202. In some embodiments, the index values 214a-d are determined or adjusted in part based on the computing resources available to the media player device 106. For example, the index calculator 212 may receive the video player identifier 120 and use this identifier 120 to determine whether to increase and/or decrease index value 214a-d based on the computing resources available to the media player device 106 associated with the identifier 120. For example, an index value 214a-d that is used with a computationally costly algorithm 114a-d may be decreased if the video player identifier 120 indicates that the video player device 106 has limited computing capacity (e.g., if the video player device 106 is a mobile device).

A parameter indicator processor 216 of the model selection component 112 then uses index values 214a-d to determine a predicted success score 218a-d for each of the available synthetic media detection algorithms 114a-d. In some cases, a single index value 214a-d may be strongly linked to a single success score 218a-d. For instance, an index values 214a-d for a face symmetry feature may be a strong indicator of the success score 218a-d for a face-symmetry based algorithm 114a-d. However, more generally, the success scores 118a-d may be determined based on any number of the index values 214a-d. For example, the parameter indicator processor 216 may use a plurality of the index values 214a-d to determine a single success score 218a-d for an algorithm 114a-d. For instance, the different index values 214a-d may be weighted differently (e.g., such that one index value 214a-d is given more weight than another index value 214a-d) for determining the success score 218a-d for each algorithm 114a-d. The parameter indicator processor 216 may employ a method of machine learning to determine the success scores 218a-d using the index values 214a-d.

An algorithm selector 220 of the model selection component 112 uses the algorithm success scores 218*a-d* to determine the selected algorithm(s) 118. For example, if at a step 224 multiple scores 218*a-d* are greater than a threshold value 222 then the algorithm selector 220 proceeds to step 226 to select multiple algorithms 118*a-d* to include as selected algorithms 118. If only one success score 218*a-d* is greater than the threshold value at step 228, the algorithm selector 220 proceeds to determine that algorithm 114*a-d* as the selected algorithm 118 at step 230. If none of the success scores 218*a-d* are greater than the threshold value 222, the algorithm selector selects none of the algorithms 114*a-d* at step 232. In such cases, a default algorithm may be used in place of the selected algorithm 118, or the media player device 106 may not determine a synthetic media probability 126.

Returning to the example operation of the system 100 of FIG. 1, the selected algorithm(s) 118 are provided to the synthetic media detection API 116, which determines a selected executor 118 to use to execute the selected algorithm(s) 118, as described above with respect to FIG. 1 and below with respect to FIG. 3. For instance, if the selected algorithm(s) 118 require more computing capacity than is available to the media player device 106, the selected executor 122 may correspond to the external-device executor 124*b*. The executor 124*a,b* corresponding to the selected executor 122 receives the frame group 110 and uses the selected algorithm(s) 118 to determine the synthetic media probability 126. The video player engine 130 displays the probability 126 along with the video 132 (e.g., on a display of the device 106).

Example Detection of Synthetic Media and Selection of Detection Model/Algorithm

Figure 3:
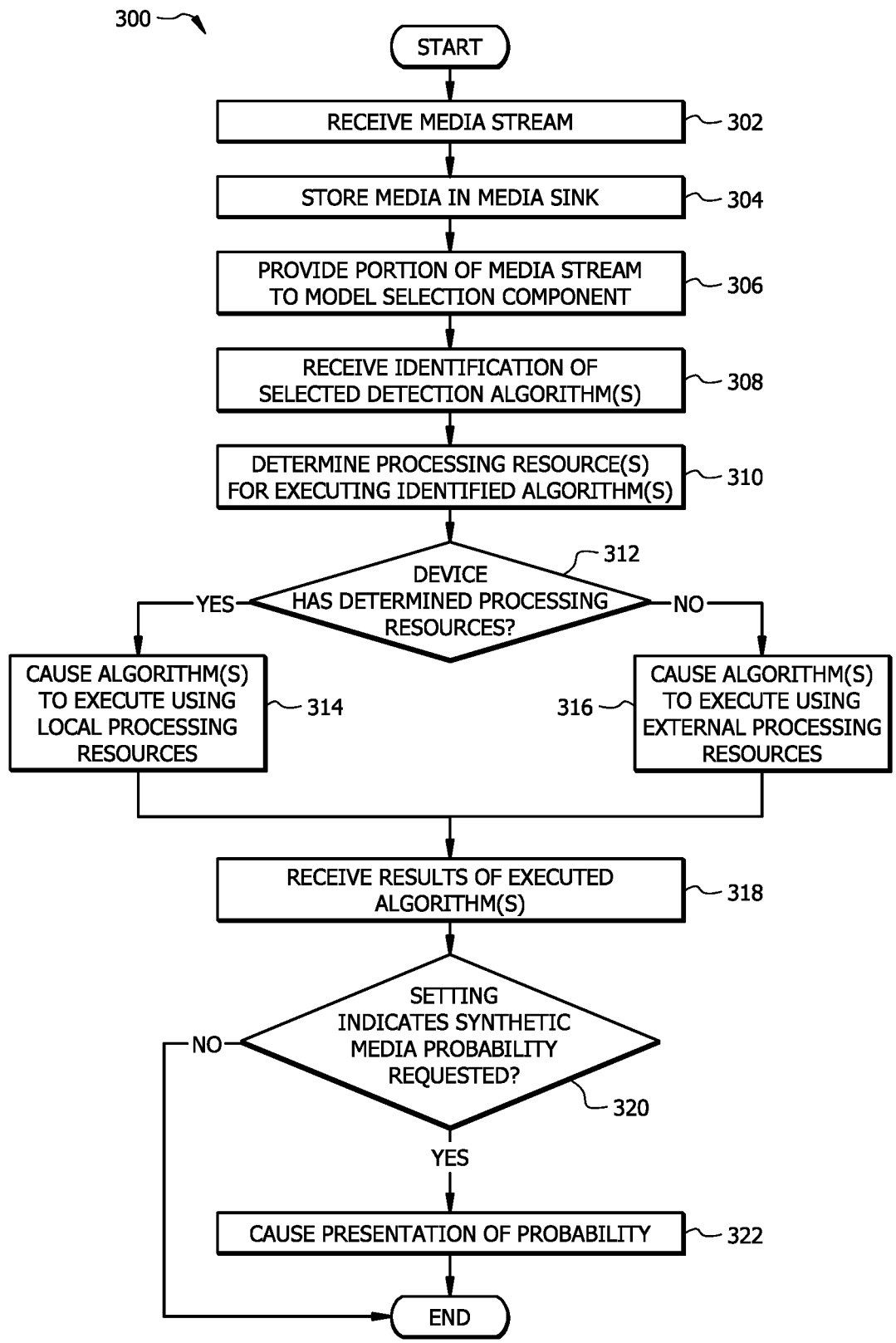
FIG. 3 is a flowchart illustrating an example method of detecting synthetic media using the media player system of FIG. 1.

FIG. 3 is a flowchart of an example method 300 for operating the system 100 of FIG. 1. The method 300 generally facilitates the determination of a probability 126 that a media stream 104 or video 132 includes synthetic media and the automatic display of this probability 126. Method 300 may begin at step 302 where the media player device 106 receives a media stream 104. At step 304, the media player device 106 stores the media stream 104 in the video-audio sink 108. For example, the media stream 104 may be stored temporarily until the synthetic media probability 126 is determined and can be presented along with a displayed video 132.

At step 306, a portion of the media stream 106 (e.g., the frame group 110 of FIGS. 1 and 2) is provided to a model selection component 112 of the media player device 106. For example, a frame group 110 including images of a person presented in the media stream 104 may be provided to the model selection component 112. At step 308, an indication of selected algorithm(s) 118 is received. The selected algorithm(s) may be determined as described above with respect to FIGS. 1 and 2 and below with respect to FIG. 4.

At step 310, the computing resources for executing the selected algorithm(s) 118 is determined. For example, the media selection device 106 may determine an amount of processing capacity and/or memory required to execute the determined algorithm(s) 118. At step 312, the media player device 106 determines whether the device 106 has at least the amount of computing resources determined at step 310. If the media player device 106 has at least the computing resources determined at step 310, the method 300 proceeds to step 314, and the selected algorithm(s) 118 is/are executed using the media player device 106 (e.g., using executor 124*a* of FIG. 1) to determine the synthetic media probability 126. For example, the media player device 106 may determine, based on a type of the algorithm(s) 118 and/or a file size of the frames selected at step 306, an amount of processing resources needed to execute the algorithm(s) 118 (e.g., a processing requirement 512 of FIG. 5). This amount of processing resources is then compared to a processing threshold of the media player device 106 (e.g., a processing threshold 514 of FIG. 5). The processing threshold generally corresponds to a maximum processing capacity of the device 106. For instance, the media player device 106 may include a graphical processing unit (e.g., GPU 510 of FIG. 5) that is configured to execute one or more of the algorithm(s) 118. If the amount of processing resources needed to execute the algorithm(s) 118 is less than or equal to the processing threshold of this graphical processing unit, then the media player device 106 uses the graphical processing unit to execute the algorithm(s) 118. For example, the executor 124*a* may use the graphical processing unit to execute the algorithm(s) 118

Alternatively, if the media player device 106 does not have at least the computing capacity determined at step 310 (or if the selected algorithm(s) 118 is/are only available on the external device or server 128), the method 300 proceeds to step 316, and the selected algorithm(s) 118 is/are executed using the external device or server 128 (e.g., using executor 124*b* of FIG. 1) to determine the synthetic media probability 126. For example, if the amount of processing resources needed to execute the algorithm(s) 118 (e.g., the processing requirement 512) exceeds the processing capacity of the media player device 106 (e.g., the processing threshold 514 of the graphical processing unit 510 of FIG. 5), then the media player device 106 may use executor 124*b* to coordinate execution of the algorithm(s) 118 using the separate device/server 128.

At step 318, the media device 106 receives the determined synthetic media probability 126. At step 320, the synthetic media device 106 may determine whether a user setting (e.g., indicated by an on-screen toggle button 134 or other selection mechanism) indicates that the synthetic media probability 126 should be displayed. For example, in some embodiments, a toggle button 134 is presented on or adjacent to the displayed video 132. If the user setting provided at the toggle button 134 indicates that the probability 126 should be displayed, the device 106 causes display of the probability 126. For example, the media player device 106 may display the media stream 104 as displayed video 132 with an overlay of the synthetic media probability 126, or the synthetic media probability 126 may be added as a watermark to the displayed video 132.

Figure 4:
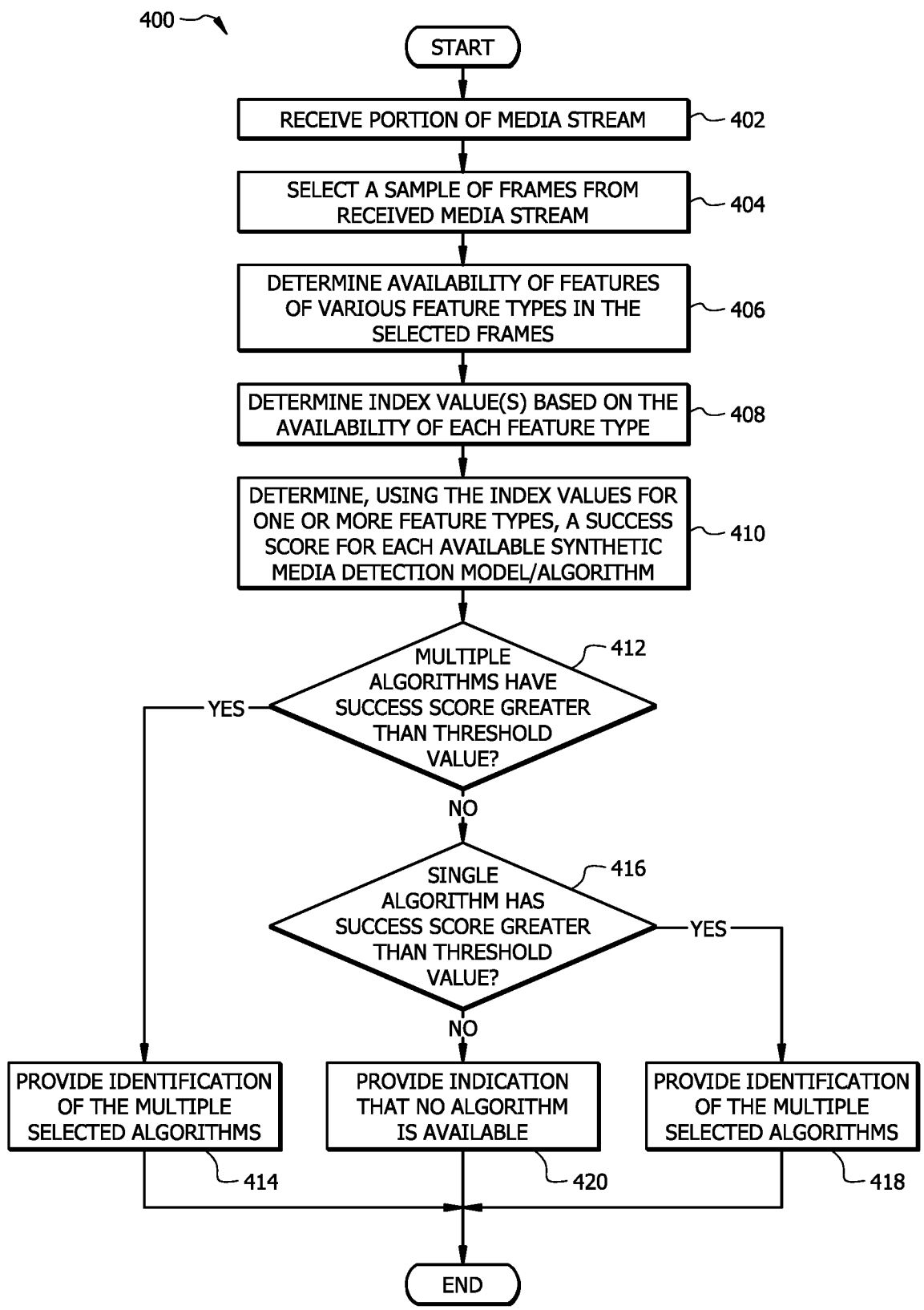
FIG. 4 is a flowchart illustrating an example method of operating the model selection component of the media player system of FIG. 1.

FIG. 4 is a flowchart of an example method 400 for operating the system 100 of FIG. 1. The method 400 generally facilitates the determination of one or more algorithm(s) 118 that are best suited to detecting synthetic media for a particular media stream 104 and based on properties of the media player device 106 used to display the video 132 included in the media stream 104. The method 400 may be implemented using the model selection component 112 of the media player device 106 (see FIGS. 1 and 2). Method 400 may begin at step 402 where the media player device 106 receives a media stream 104.

At step 404, a set of frames of the media stream 104 are selected for determining the selected algorithm(s) 118. For example, the frame sampling component 204 of FIG. 2 may determine a set of frames to use for subsequent steps of method 400. The selected frames may be determined, for example, to include images of a person presented in the media stream 104.

At step 406, the media player device 106 determines the availability 208 of features in the video frames selected at step 404. The feature availability 208 may be determined at least in part based on properties of the video frames. As described above, the feature availability 208 generally indicates whether features are present in the video frames for detecting synthetic media using one of the algorithms 114a-d. As an example, if a facial symmetry feature type presented in the video frames, the media player device 106 may determine that a facial feature is present in the video frames and that there is a positive availability 208 of facial features. Examples of facial features include the mouth, eyes, nose, and ears of a person presented in the media stream 104 or video 132. For example, the media player device 106 may determine whether one or more of the mouth, eyes, nose, and ears of a person are presented in the media stream 104. If one or more of the features are absent, the media player device 106 may determine that the facial feature is not present. For example, in some embodiments, if both eyes of a person are not detected, the media player device 106 determines that the facial feature is not present (e.g., because both eyes may be needed to us a face symmetry-based algorithm 114a-d for the determination of the synthetic media probability 126). In other embodiments, only a subset of all facial features need to be detected in order to determine that the facial feature is present. For example, if both eyes are detected, the media player device 106 may determine that the facial feature is detected. As another example, if the entire mouth is detected, the media player device 106 may determine that the facial feature is detected. In other embodiments, at least two of the facial features must be detected in order to determine that the facial feature is detected. For example, if both the eyes and the entire mouth of the person is detected, the media player device 106 may determine that the facial feature is detected. As another example, if the media stream 104 is associated with a distributed ledger authenticating the video 132, this association may be used to determine a positive availability 208 of blockchain features. As yet another example, if a biometric feature type (e.g., flushing of skin in video frames) is presented in the video frames, the media player device 106 may determine a positive availability 208 of biometric features that may be, for example, extracted from the video frames using at least one of the algorithms 114a-d.

At step 408, index values 214a-d are determined using the feature availabilities from step 406. The index value 214a-d allow the feature availabilities 208 to be presented as a quantitative value (e.g., a value from zero to one, or the like). Examples of index values 214a-d that may be determined at step 408 are described in greater detail above with respect to the parameter applicability calculator 212 of FIG. 2. As described further below, the selected algorithm 118 is determined using the availability 208 of various feature types and/or the index values 214a-d. As an example, if a first feature type has a high availability 208 and/or index value 214a-d and a second feature type has a low availability 208 and/or index value 214a-d, a first algorithm 114a-d that uses the first feature type may be selected instead of a second algorithm 114a-d that uses the second feature type.

At step 410, the media player device 106 determines a predicted success score 218a-d for each of the available synthetic media detection algorithms 114a-d. The predicted success scores 218a-d correspond to a measure of how successful each algorithm 114a-d is likely to be at accurately detecting synthetic media in the media stream 104 or video 132. The media player device 106 may use one or more of the index values 214a-d to determine a single success score 218a-d. For instance, the different index values 214a-d may be weighted differently (e.g., such that one index value 214a-d is given more weight than another index value 214a-d) for determining the success score 218a-d for each algorithm 114a-d. In some cases, the media player device 106 may use a method of machine learning at step 410 to determine the success scores 218a-d using the index values 214a-d.

At step 412, the media player device 106 determines whether multiple algorithms 114a-d have success score 218a-d greater than a threshold value 222. If multiple success scores 218a-d are greater than the threshold value 222, then the method 400 proceeds to step 414. At step 414, multiple algorithms 118a-d are identified as the selected algorithms 118.

If multiple success scores 218a-d are not greater than the threshold value 222, the method proceeds to step 416 and determines whether one algorithm 114a-d has a success score 218a-d greater than the threshold value 222. If one success score 218a-d is greater than the threshold value at step 416, the method 400 proceeds to step 418. At step 418, the one algorithm 114a-d with the success score 218a-d greater than the threshold value 222 is identified as the selected algorithm 118.

If one algorithm 114a-d does not have a success score 218a-d greater than the threshold value 222 at step 416, an indication may be provided that no algorithm 114a-d is available at step 420. In such cases, a default algorithm may be used to determine the synthetic media probability 126, or the media player device 106 may not determine a synthetic media probability 126. Steps of the method 300 of FIG. 3 and the method 400 of FIG. 4 may be combined. For instance, the selected algorithm(s) 118 received at step 308 of method 300 may be the algorithm(s) indicated at steps 141 or 418 of method 400.

Example Device for Synthetic Media Detection

Figure 5:
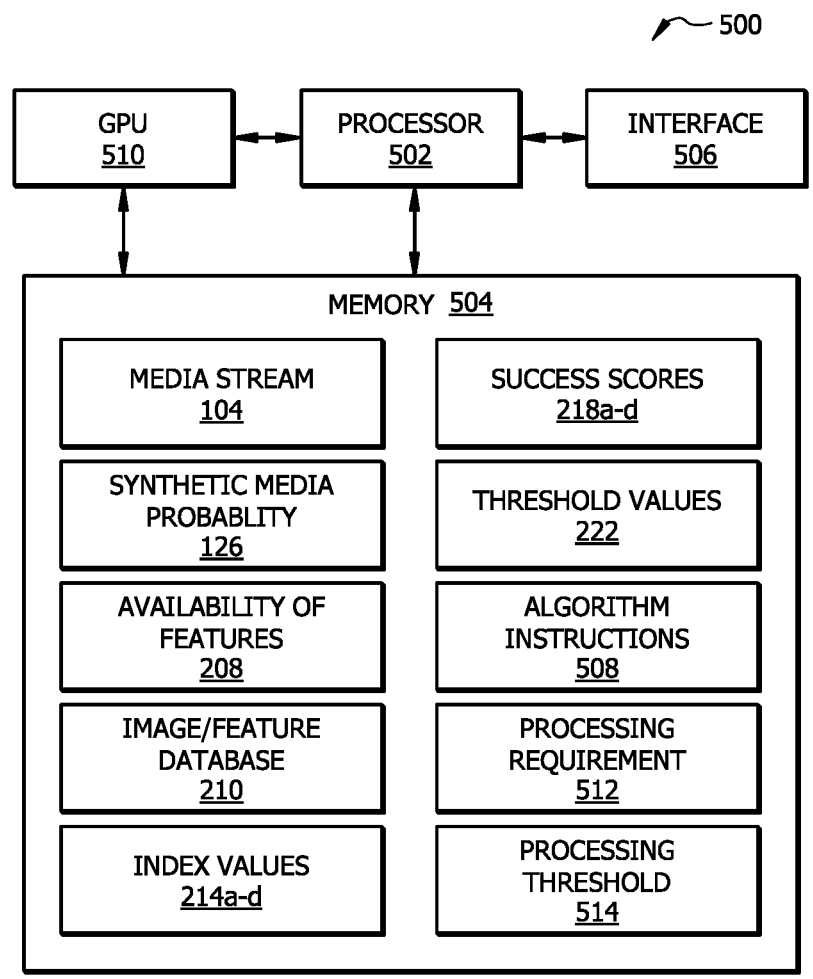
FIG. 5 is a diagram of an example device configured to implement various components of the system of FIG. 1.

FIG. 5 is an embodiment of a device 500 configured to implement the system 100. The device 500 includes a processor 502, a memory 504, a network interface 506, and a graphical processing unit (GPU) 510. The device 500 may be configured as shown or in any other suitable configuration. The device 500 may be and/or may be used to implement the media source 102, the media player 106, and the external device or server 128 of FIG. 1 and the model selection component 112 of FIGS. 1 and 2.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504, the network interface 506, and the GPU 510. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory 504 and executes them by directing the coordinated operations of the ALU, registers and other components. The one or more processors are configured to implement various instructions.

For example, the one or more processors are configured to execute instructions to implement the function disclosed herein, such as some or all of those described with respect to the methods 300 and 400 of FIGS. 3 and 4. In an embodiment, the function described herein is implemented using logic units, FPGAs, ASICs, DSPs, or any other suitable hardware or electronic circuitry.

The memory 504 is operable to store the media stream 104, algorithm instructions 508, the synthetic media probability 126, feature availabilities 208, index values 214a-d, success scores 218a-d, the image/feature database 210, threshold values 222, capacity requirement(s) 512, capacity threshold(s) 514, and any other data, instructions, logic, rules, or code operable to execute the function described in this disclosure. The algorithm instructions 508 include any data, instructions, logic, rules, or code operable to execute the synthetic media detection algorithms 114a-d described in this disclosure. The capacity requirement(s) 512 are the determined amount of computing resources needed to execute one or more selected algorithm(s) 118, as described above with respect to FIG. 3. The capacity threshold(s) 514 generally include a predefined threshold value associated with the computing capacity of the media player device 106. For example, the capacity threshold(s) 514 may indicate a maximum amount of processing resources available to the media player device 106 (e.g., provided by the processor 502 and/or GPU 510), a memory capacity of the media player device 106 (e.g., provided by the memory 504), and/or a network capacity of the media player device 106 (e.g., provided by the interface 506). The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

The GPU 510 is generally any appropriate graphical processing unit or collection of graphical processing units. A graphical processing unit is generally a specialized processor optimized for handling image data. In some embodiments, the GPU 510 is included, incorporated, or embedded in the processor 502, described above. The GPU is in communication with at least the processor 502 and may also be in communication with the memory 506 and/or interface 506. The GPU 510 is configured to implement various instructions, for example, for the execution of one or more of the algorithm(s) 118 described in this disclosure and/or for the execution of other function disclosed herein, such as some or all of those described with respect to the methods 300 and 400 of FIGS. 3 and 4. The GPU 510 is configured to process data and may be implemented in hardware and/or software. The GPU 510 may have any suitable architecture.

For example, the one or more processors are configured to execute instructions to implement the While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
 a media source configured to provide a media stream comprising an audio-video recording, wherein the audio-video recording comprises image frames; and
 a video presentation device comprising a memory and a processor communicatively coupled to the memory;
 the memory storing instructions configured to, when executed by the processor:
  implement a first algorithm for detecting a presence of synthetic media in a video based on properties of a first feature type in the video; and
  implement a second algorithm for detecting the presence of synthetic media in the video based on properties of a second feature type in the video; and
 the processor configured to:
  select a portion of the image frames of the media stream;
  determine, based at least in part on properties of the selected portion of the image frames, that the first feature type is presented in the selected portion of the image frames;
  determine, based at least in part on properties of the selected portion of the image frames, that the second feature type is not presented in the selected portion of the image frames;
  in response to determining that the first feature type is presented in the selected portion of the image frames and that the second feature type is not presented in the selected portion of the image frames, select the first algorithm for synthetic media detection;
  execute the selected first algorithm using the selected portion of the image frames as an input; and
  determine, based on the executed first algorithm, a probability that the media stream provided by the media source includes synthetic media.

2. The system of claim 1, wherein the processor is further configured to:
- determine a first score corresponding to a probability that the first algorithm can detect synthetic media in the media stream provided by the media source;
- determine that the first score is greater than a threshold value; and
- execute the first algorithm in response to determining the first score is greater than the threshold value.

3. The system of claim 2, wherein the processor is further configured to determine the first score corresponding to the probability that the first algorithm can detect synthetic media in the media stream by:
- determining, based on properties of features of the first feature type in the selected portion of the image frames, a first index value;
- determining, based on properties of features of the second feature type in the selected portion of the image frames, a second index value; and
- determining the first score using the first and second index values.

4. The system of claim 2, wherein the processor is further configured to:
- determine a second score corresponding to a probability that the second algorithm can detect synthetic media in the media stream provided by the media source; and
- determine that the second score is not greater than the threshold value.

5. The system of claim 1, wherein:
- the first feature type is a facial feature presented in the audio-video recording; and
- the processor is further configured to:
  - determine that the facial feature is present in the audio-video recording; and
  - determine, based on the presence of the facial feature in the audio-video recording, that the first feature type is present in the selected portion of the image frames.

6. The system of claim 1, wherein:
- the first feature type corresponds to association of the audio-video recording with a distributed ledger authenticating the audio-video recording; and
- the processor is further configured to:
  - determine that the audio-video recording is associated with the distributed ledger; and
  - determine, after determining that the audio-video recording is associated with the distributed ledger, that the first feature type is present in the selected portion of the image frames.

7. The system of claim 1, wherein:
- the first feature type is a biometric feature presented in the audio-video recording; and
- the processor is further configured to:
  - determine that the biometric feature can be extracted from the audio-video recording using the first algorithm; and
  - determine, based on the determination that the biometric feature can be extracted from the audio-video recording using the first algorithm, that the first feature type is present in the selected portion of the image frames.

8. A method comprising, by a processor of a video presentation device:
- storing, in a memory of the video presentation device, instructions configured to, when executed by the processor:
  - implement a first algorithm for detecting a presence of synthetic media in a video based on properties of a first feature type in the video; and
  - implement a second algorithm for detecting the presence of synthetic media in the video based on properties of a second feature type in the video; and
- the processor configured to;
- receiving a media stream comprising an audio-video recording, wherein the audio-video recording comprises image frames;
- selecting a portion of image frames of the media stream;
- determining, based at least in part on properties of the selected portion of the image frames, that the first feature type is presented in the selected portion of the image frames;
- determining, based at least in part on properties of the selected portion of the image frames, that the second feature type is not presented in the selected portion of the image frames;
- in response to determining that the first feature type is presented in the selected portion of the image frames and that the second feature type is not presented in the selected portion of the image frames, selecting the first algorithm for synthetic media detection;
- executing the selected first algorithm using the selected portion of the image frames as an input; and
- determining, based on the executed first algorithm, a probability that the media stream provided by the media source includes synthetic media.

9. The method of claim 8, further comprising:
- determining a first score corresponding to a probability that the first algorithm can detect synthetic media in the media stream provided by the media source;
- determining that the first score is greater than a threshold value; and
- executing the first algorithm in response to determining the first score is greater than the threshold value.

10. The method of claim 9, further comprising determining the first score corresponding to the probability that the first algorithm can detect synthetic media in the media stream by:
- determining, based on properties of features of the first feature type in the selected portion of the image frames, a first index value;
- determining, based on properties of features of the second feature type in the selected portion of the image frames, a second index value; and
- determining the first score using the first and second index values.

11. The method of claim 9, further comprising:
- determining a second score corresponding to a probability that the second algorithm can detect synthetic media in the media stream provided by the media source; and
- determining that the second score is not greater than the threshold value.

12. The method of claim 8, wherein:
- the first feature type is a facial feature presented in the audio-video recording; and
- the method further comprises:
  - determining that the facial feature is present in the audio-video recording; and
  - determining, based on the presence of the facial feature in the audio-video recording, that the first feature type is present in the selected portion of the image frames.

13. The method of claim 8, wherein:
the first feature type corresponds to association of the audio-video recording with a distributed ledger authenticating the audio-video recording; and
the method further comprises:
  determining that the audio-video recording is associated with the distributed ledger; and
  determining, after determining that the audio-video recording is associated with the distributed ledger, that the first feature type is present in the selected portion of the image frames.

14. The method of claim 8, wherein:
the first feature type is a biometric feature presented in the audio-video recording; and
the method further comprises:
  determining that the biometric feature can be extracted from the audio-video recording using the first algorithm; and
  determining, based on the determination that the biometric feature can be extracted from the audio-video recording using the first algorithm, that the first feature type is present in the selected portion of the image frames.

15. A video presentation device, comprising:
a network interface configured to communicate with a media source configured to provide a media stream comprising an audio-video recording, wherein the audio-video recording comprises image frames;
a memory storing instructions configured to, when executed by the processor:
  implement a first algorithm for detecting a presence of synthetic media in a video based on properties of a first feature type in the video; and
  implement a second algorithm for detecting the presence of synthetic media in the video based on properties of a second feature type in the video; and
a processor communicatively coupled to the network interface and the memory, the processor configured to:
  select a portion of the image frames of the media stream;
  determine, based at least in part on properties of the selected portion of the image frames, that the first feature type is presented in the selected portion of the image frames;
  determine, based at least in part on properties of the selected portion of the image frames, that the second feature type is not presented in the selected portion of the image frames;
  in response to determining that the first feature type is presented in the selected portion of the image frames and that the second feature type is not presented in the selected portion of the image frames, select the first algorithm for synthetic media detection;
  execute the selected first algorithm using the selected portion of the image frames as an input; and
  determine, based on the executed first algorithm, a probability that the media stream provided by the media source includes synthetic media.

16. The video presentation device of claim 15, wherein the processor is further configured to:
  determine a first score corresponding to a probability that the first algorithm can detect synthetic media in the media stream provided by the media source;
  determine that the first score is greater than a threshold value; and
  execute the first algorithm in response to determining the first score is greater than the threshold value.

17. The video presentation device of claim 16, wherein the processor is further configured to determine the first score corresponding to the probability that the first algorithm can detect synthetic media in the media stream by:
  determining, based on properties of features of the first feature type in the selected portion of the image frames, a first index value;
  determining, based on properties of features of the second feature type in the selected portion of the image frames, a second index value; and
  determining the first score using the first and second index values.

18. The video presentation device of claim 15, wherein:
the first feature type is a facial feature presented in the audio-video recording; and
the processor is further configured to:
  determine that the facial feature is present in the audio-video recording; and
  determine, based on the presence of the facial feature in the audio-video recording, that the first feature type is present in the selected portion of the image frames.

19. The video presentation device of claim 15, wherein:
the first feature type corresponds to association of the audio-video recording with a distributed ledger authenticating the audio-video recording; and
the processor is further configured to:
  determine that the audio-video recording is associated with the distributed ledger; and
  determine, after determining that the audio-video recording is associated with the distributed ledger, that the first feature type is present in the selected portion of the image frames.

20. The video presentation device of claim 15, wherein:
the first feature type is a biometric feature presented in the audio-video recording; and
the processor is further configured to:
  determine that the biometric feature can be extracted from the audio-video recording using the first algorithm; and
  determine, based on the determination that the biometric feature can be extracted from the audio-video recording using the first algorithm, that the first feature type is present in the selected portion of the image frames.

* * * * *